July 16, 1957 A. J. TORRE ET AL 2,799,723

COLOR TELEVISION RECEIVER

Filed Jan. 24, 1952

INVENTORS.
Alton J. Torre,
Loren R. Kirkwood
& Robert D. Flood
BY
ATTORNEY 2,799,723
Patented July 16, 1957

2,799,723

COLOR TELEVISION RECEIVER

Alton J. Torre, Westmont, and Loren R. Kirkwood and Robert D. Flood, Haddonfield, N. J., assignors to Radio Corporation of America, a corporation of Delaware Application January 24, 1952, Serial No. 268,032
2 Claims. (Cl. 178—5.4)

Figure 1:
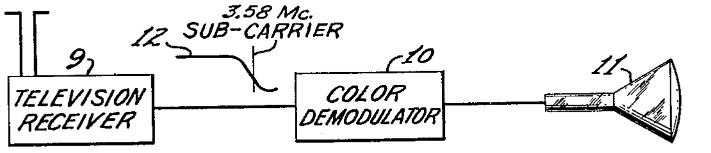

This invention relates to electronic systems of the type responsive to complex signals having both carrier and subcarrier modulation components. In particular it relates to such systems in which one sideband and only a portion of the other sideband are utilized in transmitting the signals.

It is well known in the art that vestigial sideband operation provides good reproduction and frequency spectrum efficiency in television transmission. The present television standards therefore provide for such transmission. Usual advantages of such systems are described in publications such as the U. S. Patent 2,300,501 to G. L. Grundmann and a paper by W. J. Poch and D. W. Epstein entitled "Partial suppression of one sideband in television reception," RCA Review, vol. 1, p. 19, 1937.

The novel combination of elements provided in accordance with the teachings of the present invention afford many additional features of advantage in connection with color television and like systems, as will be pointed out in more detailed form hereinafter.

One particular embodiment of the invention is contained in a color subcarrier type of television system having brightness signals amplitude modulated on the carrier wave and color signals phase modulated on the subcarrier wave. The subcarrier wave normally has a frequency within the video frequency pass-band of the system.

General operational features of color subcarrier systems are now well known in the art and may be found in such publications as The Proceedings of the Institute of Radio Engineers for October 1951. It is to be recognized that the art is in the process of continual development and therefore certain of the waveforms and frequencies described in connection with the present invention are only illustrative.

It has been noted that a certain amount of carrier-subcarrier interference is afforded in color subcarrier systems even though incorporating the so called "dot interlace" principle. This is due to the different brightness levels which may be required for the different primary color signals. Since the subcarrier amplitude for signals having the lowest or highest brightness components may have portions extending into the whiter than white or blacker than black regions they impart no intelligence to the kinescope screen which may be interlaced out. Accordingly by providing vestigial sideband response characteristics in the receiver for both the carrier and subcarrier waves, the subcarrier amplitude may be kept smaller at the kinescope without deteriorating the performance. In this manner the carrier is less likely to extend beyond the white or black levels and thereby interlacing cancellation is afforded to the subcarrier over a larger range of brightness variation than before possible.

In addition a certain amount of inter-carrier interference is afforded during changes of scene or other motion sequences in a color subcarrier system. As taught by F. Gray in U. S. Patent 1,769,920, two carriers may be chosen to interleave such that direct beat interference therebetween is minimized and may be completely cancelled out in still television scenes. By means of the present invention the interference present during moving scenes that becomes visible on the kinescope screen may be further reduced by affording vestigial sideband response for both the carrier and subcarrier so that they may be moved further apart in frequency within the same frequency band with the resulting overlap of sideband frequencies occurring in lower energy overlap regions. Any beat interference thereby becomes less apparent in the reproduced scene on the kinescope screen.

The present invention therefore is directed to subcarrier communication systems including band pass means for translating the entire band of frequencies between the carrier and subcarrier waves together with means for causing vestigial side band response at opposite sides of the band to the carrier and subcarrier waves respectively.

It is therefore an object of the invention to provide a color television system for reproducing a picture of maximum detail when the system is operating in a television channel having relatively narrow frequency limits.

A further object of the invention is to provide means for improving the color subcarrier interlacing operation in a color television system.

A still further object of the invention is to provide a subcarrier electronic system with a minimum of beat interference between the carrier and subcarrier.

Figure 2A:
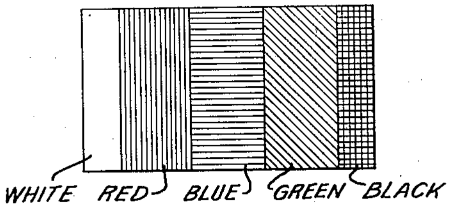
Figure 3A:
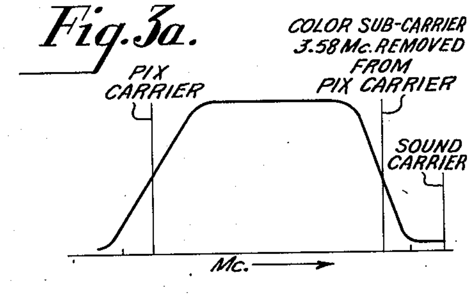
Figure 2B:
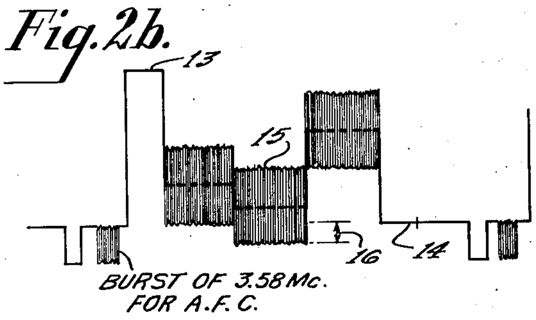
Figure 3B:
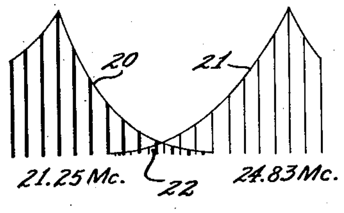
Figure 4:
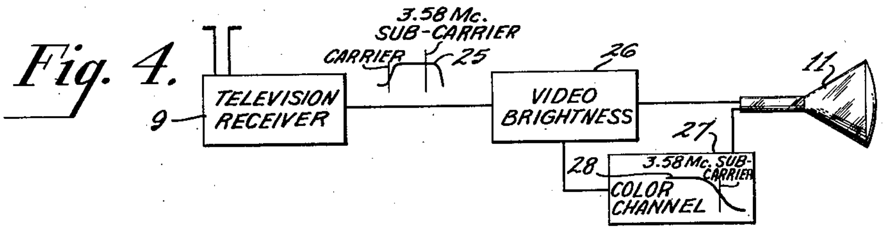
Figure 5:
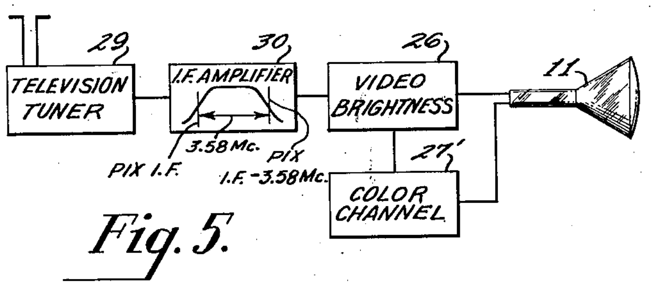

Other objects and features of advantage of the invention will be made apparent to those skilled in the art by the following detailed description of the invention and its mode of operation. A more clear understanding of the invention may be afforded when considering the description in connection with the accompanying drawing, in which:

Figure 1 is a block diagram of a color television circuit operating in accordance with the principles of the present invention;

Figures 2*a* and 2*b* are diagrammatic representations of specific conditions that may exist in a color subcarrier system which illustrate certain advantages of the invention;

Figures 3*a* and 3*b* are response characteristics charts of a system operating in accordance with the teachings of the present invention;

Figures 4 and 5 are further block circuit diagrams of color television systems constructed in accordance with the invention.

Throughout the respective views, like circuit components will be identified by similar reference characters to facilitate comparison. Those circuits which may in themselves be conventional, and whose details form no part of the present invention are shown in block diagram form so that the nature of the invention may be more readily understood.

Referring now specifically to Figure 1, a suitable color subcarrier television receiver 9 is connected to a color demodulator system 10 which provides at the color tube 11 a signal for color picture reproduction. In the system the subcarrier frequency is designated as 3.58 megacycles and is chosen to have a specific frequency related in accordance with well known color television principles to a harmonic of the scanning frequency in order to afford proper interlacing of information.

The television receiver 9 contains translation circuits having a pass band commensurate with those assigned to television channels. In accordance with the present invention the pass band circuits are designed to have a vestigial side band response to the color subcarrier as indicated graphically at 12. It is within the realm of those skilled in the art to provide a particular shape to the response characteristics, once the desired combination and the resulting advantage is pointed out. Therefore it is not necessary and would only obscure the nature of the invention in the present case to point out in particularity for each figure the exact manner in which the vestigial sideband response is obtained or in which the slope is imparted to the response characteristic.

Consider now the charts of Figure 2 where Figure 2*a* represents a specific pattern which is to be presented upon the color tube 11 of Figure 1. Figure 2*b* represents graphically that video component which includes only the resulting color subcarrier waveform for any given line. The white level is indicated at 13 and the black level is indicated at 14. The blue carrier 15 in the illustrated case has a portion extending beyond the black level 14 into the blacker than black region 16. Subcarrier components are usually interlaced out on the kinescope screen and provide no dot or beat interference intelligible by the eye when signals of opposite brightness characteristics balance out during successive scannings of a given line of information. In the given illustration, however, since the blacker than black component affords no signal information to the picture tube, imperfect interlace cancellation results, and a dot pattern will result at the 3.58 mc. subcarrier frequency.

By means of the present invention, however, the vestigial sideband response to the subcarrier wave decreases the subcarrier amplitude at the picture tube where the interlacing occurs. Therefore the subcarrier wave component is less likely to extend into the nonintelligible regions and dot interference is less likely to be encountered.

Further advantage of the invention may be recognized from the response curves of Figures 3*a* and 3*b*. Therein Figure 3*a* is a typical idealized overall passband response curve of a color television system. It is clear that vestigial sideband response is afforded by placing the carrier and subcarrier frequencies at either end of the passband such that they both lie upon the response slope. In this respect it is noted that there are many ways of providing vestigial sideband response, and the overall transmitter to demodulator response shape is represented by the curve in Figure 3*a*. The preferred manner of obtaining the response for commercial reasons, however, is to provide a constant output level from the transmitter within the confines of the video bandwidth and to design the receiver response to be similar to that of Figure 3*a*.

In a television system energy concentrations occur at a series of frequencies each of which is a harmonic of the field and line scanning frequenices. The color subcarrier frequency is chosen such that the subcarrier energy concentrations interweave with those of the carrier. Accordingly a resulting spectrum such as shown in Figure 3*b* results. It is to be recognized that the energy concentrations of Figure 3*b* are diagrammatic and are not to scale for purpose of simplicity in describing the operation of the invention. When the frequency of the energy concentrations departs from the region of the respective carriers the energy rapidly falls off as indicated by curves 20 and 21. That is to say the energy at the higher response frequencies for both the carrier and subcarrier modulation components becomes smaller.

In the present invention therefore improved color response is obtained by providing vestigial sideband response to both the carrier and subcarrier waves and thereby by separating the carrier and subcarrier waves a greater distance for any given bandwidth. In doing this the overlap region 22 of Figure 3*b* of the two carriers, where any beat interference between the carrier and subcarrier waves is most likely to take place, is provided in the lower energy regions. Accordingly less noticeable interference will result on the viewing screen with a more pleasing reproduced picture.

Certain advantages may be obtained by the present invention in providing the vestigial sideband response for the color subcarrier in the color channel itself as shown in Figure 4. The receiver 9 is tuned to have a passband response 25 extending beyond the color subcarrier region. The brightness component resulting may therefore have a wider frequency response and show greater picture detail. This will be at the expense of some dot inteference, which might be reduced with a lower amplitude color carrier response at the brightness channel 26. For both color and black and white pictures the response will otherwise be more pleasing because of the greater available detail. The chroma or color channel 27 in this embodiment has a passband characteristic 28 so shaped to afford substantially equal energy frequency distribution vestigial sideband response to the 3.58 mc. subcarrier wave, with the resulting advantages hereinbefore pointed out.

By obtaining the entire response slope characteristic in the intermediate frequency amplifier channel 30, as illustrated in the further embodiment of Figure 5, the dot structure response may be improved by reducing the subcarrier amplitude available at the video brightness demodulator. In this embodiment of the invention, however, the detail of the brightness component may be decreased at times when high fidelity video signals are received because the response characteristic curve of the receiver falls off at the higher video frequencies above the subcarrier frequency. The particular embodiment of the invention to be preferred in each instance depends upon the requirements of individual systems and the weight to be given the various advantages of each embodiment.

From the foregoing description of the invention it is clear that the operation of a subcarrier electronic system is greatly improved by providing a vestigial sideband response at opposite sides of the system passband respectively to the carrier and subcarrier waves.

What is claimed is:

1. In a color television signal receiving system for receiving a color television signal having an amplitude modulated monochrome type carrier component with vestigial frequency distribution of its side bands and a phase and amplitude modulated color subcarrier component, said phase modulation depicting color hue information and said amplitude modulation depicting color saturation information, said color television signal further including a line synchronizing component having a recurrence frequency substantially one half the value of which is an odd subharmonic of said color subcarrier whereby frequency interlace is achieved, said color television signal further including a black level datum component of an amplitude in excess of which subcarrier amplitude excursions may conditionally extend as a result of color saturation changes, the combination of: means receiving said color television signal and producing therefrom a composite electrical signal representative of the components comprising said color television signal; band pass amplifier means having an input circuit and an output circuit, said input circuit being coupled with said receiving means for accepting said composite electrical signal from said receiving means and amplifying substantially all frequency components in said composite signal for delivery to said output circuit; means connected in said amplifier means for producing a frequency response characteristic at one extremity of the overall frequency response characteristic of said band pass amplifier so defined that said monochrome type carrier falls along a first sloped portion of said overall frequency response characteristic said first slope portion embracing the vestigial side band component of said monochrome carrier to provide substantially equal energy representation of monochrome carrier side band components in said band pass amplifier output circuit; and means connected in said amplifier means for producing a second sloped portion at the other extremity of said overall frequency response characteristic of said band pass amplifier, said second sloped portion defining a frequency response characteristic such that the frequency of said color subcarrier falls along said slope whereby the tendency for color subcarrier excursions in excess of said black level datum is reduced and a minimum of cross talk between said carriers is realized.

2. A color television signal receiving system according to claim 1 wherein said means for producing said second sloped portion of said frequency response characteristic establishes the frequency of said subcarrier at approximately one half the maximum response of the amplifier for any frequency falling in said overall band bass frequency response characteristic.

References Cited in the file of this patent

UNITED STATES PATENTS

| | | |
|---|---|---|
| 2,270,539 | Malling | Jan. 20, 1942 |
| 2,498,561 | Lipkin | Feb. 21, 1950 |
| 2,573,248 | Cotsworth | Oct. 30, 1951 |
| 2,626,323 | Sziklai | Jan. 20, 1953 |
| 2,636,937 | Fredendall et al. | Apr. 28, 1953 |
| 2,714,132 | Fredendall | July 26, 1955 |
| 2,763,717 | Richman | Sept. 18, 1956 |

OTHER REFERENCES

Proceedings of the I. R. E., October 1951, p. 1275.

Principles of MTSC compatible color television, Electronics, February 1952, pp. 88–97 (presented at the IRE-RTMA, Toronto, October 1951).

A Six megacycle . . . television system, Television, vol. VI, pp. 270–290, published by RCA Review.